United States Patent
Wolfner et al.

(10) Patent No.: US 10,536,213 B2
(45) Date of Patent: Jan. 14, 2020

(54) ESTABLISHMENT OF PACKET DATA NETWORK CONNECTION VIA RELAY USER EQUIPMENT

(71) Applicant: NOKIA SOLUTIONS AND NETWORKS OY, Espoo (FI)

(72) Inventors: Gyorgy Tamas Wolfner, Budapest (HU); Curt Wong, Bellevue, WA (US); Devaki Chandramouli, Plano, TX (US); Rainer Liebhart, Munich (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 120 days.

(21) Appl. No.: 14/903,409

(22) PCT Filed: Jul. 8, 2013

(86) PCT No.: PCT/US2013/049611
§ 371 (c)(1),
(2) Date: Jan. 7, 2016

(87) PCT Pub. No.: WO2015/005900
PCT Pub. Date: Jan. 15, 2015

(65) Prior Publication Data
US 2016/0156404 A1    Jun. 2, 2016

(51) Int. Cl.
*H04B 7/155* (2006.01)
*H04W 76/14* (2018.01)
(Continued)

(52) U.S. Cl.
CPC ........ *H04B 7/15507* (2013.01); *H04W 76/14* (2018.02); *H04W 76/12* (2018.02); *H04W 88/04* (2013.01); *H04W 88/16* (2013.01)

(58) Field of Classification Search
CPC .. H04B 7/15507; H04W 76/14; H04W 76/12; H04W 88/16; H04W 88/04
See application file for complete search history.

(56) References Cited

U.S. PATENT DOCUMENTS

| | | |
|---|---|---|
| 2012/0113887 A1 | 5/2012 | Shen et al. |
| 2013/0142070 A1 | 6/2013 | Matsuo et al. |

(Continued)

OTHER PUBLICATIONS

International Search Report and Written Opinion dated Sep. 9, 2013 corresponding to International Patent Application No. PCT/US2013/049611.

(Continued)

*Primary Examiner* — Omar J Ghowrwal
(74) *Attorney, Agent, or Firm* — Squire Patton Boggs (US) LLP

(57) ABSTRACT

Various communication systems may benefit from the use of relayed packet data connection. Moreover, such communication systems may benefit from methods and systems for the establishment of a packet data network connection for a proximity services user equipment via a relay user equipment. A method can include establishing a packet data network connection between a relay user equipment and a packet data network gateway. The method can also include establishing a relay connection between a proximity services user equipment and the packet data network gateway. The relay connection can be a connection within the packet data network connection.

18 Claims, 9 Drawing Sheets

(51) Int. Cl.
   *H04W 76/12* (2018.01)
   *H04W 88/16* (2009.01)
   *H04W 88/04* (2009.01)

(56) References Cited

U.S. PATENT DOCUMENTS

| | | | | |
|---|---|---|---|---|
| 2013/0191831 A1* | 7/2013 | Goyal | ............ | G06F 9/46 718/100 |
| 2013/0258941 A1* | 10/2013 | Rohit | ............ | H04W 72/04 370/315 |
| 2014/0071969 A1* | 3/2014 | Roeland | ............ | H04W 76/026 370/338 |
| 2015/0010010 A1* | 1/2015 | Xie | ............ | H04L 45/04 370/401 |
| 2015/0215895 A1* | 7/2015 | Iwai | ............ | H04W 68/04 455/458 |

OTHER PUBLICATIONS

3GPP TS 22.278 V12.3.0 (Jun. 2013), Technical Specification, 3rd Generation Partnership Project; Technical Specification Group Services and System Aspects; Service requirements for the Evolved Packet System (EPS) (Release 12), Jun. 2013, 45 pages.

3GPP TR 23.703 V0.4.1 (Jun. 2013), Technical Report, 3rd Generation Partnership Project; Technical Specification Group Services and System Aspects; Study on architecture enhancements to support Proximity Services (ProSe) (Release 12), Jun. 2013, 85 pages.

ETSI TS 123 101 V8.0.0 (Jan. 2009), Technical Specification, Universal Mobile Telecommunications System (UMTS) LTE; General UMTS Architecture (3GPP TS 23.101 version 8.0.0 Release 8), Jan. 2009.

* cited by examiner

ESTABLISHMENT OF PACKET DATA NETWORK CONNECTION VIA RELAY USER EQUIPMENT

BACKGROUND

Field

Various communication systems may benefit from the use of relayed packet data connection. Moreover, such communication systems may benefit from methods and systems for the establishment of a packet data network connection for a proximity services user equipment via a relay user equipment.

Description of the Related Art

The third generation partnership project (3GPP) includes consideration of direct user equipment to user equipment (UE-UE) communication over a long term evolution (LTE) radio interface, even when there is no network coverage. This direct UE-UE communication can relate to Proximity Services (ProSe). Such ProSe services may be used for public safety communication over LTE radio, see section 7 of 3GPP technical specification (TS) 22.278 and 3GPP technical report (TR) 23.703, each of which is hereby incorporated by reference herein in its entirety.

FIG. 1 illustrates a user equipment to network relay scenario. This scenario is one that may be particularly helpful for public safety services. In this scenario, a UE that is out of coverage and supporting direct communication, referred to as ProSe UE 110, can be connected to the network via another UE that is in coverage and supports relaying, referred to as relay UE 120. Although only one ProSe UE 110 is shown, a single relay UE 120 can perform relaying for several ProSe UEs.

One technical issue in scenarios such as this is how the bearer(s) and connection(s) between the ProSe UE(s) 110 and the relay UE 120 are mapped into the bearer(s) and connection(s) between the relay UE 120 and the 3GPP network 130. The service 140 to be provided over the 3GPP network 130 may not necessarily need to know the mechanism, but some mechanism may be needed.

FIG. 2 illustrates bearer sharing. In order to have an efficient solution, the EPS bearer(s) that are between the relay UE 120 and the 3GPP network, such as elements eNB/SGW 230 and PGW 240, can be shared among the ProSe UEs 110a and 110b. As shown in FIG. 2, a single EPS bearer 250 can be used to transfer application data of the different ProSe UEs 110a and 110b, and also data of the relay UE 120 itself. Thus, the EPS bearer 250 is not necessarily limited to carrying the contents of ProSe bearer 260a and ProSe bearer 260b.

Conventionally, when a 3GPP UE shares its connection among devices, typically over its WiFi interface, is when the UE acts as router. The same approach can be used in a network-to-UE relay scenario.

In this approach, the relay UE assigns the IP addresses to the UEs. Typically with IPv4 the relay UE assigns private IPv4 address to ProSe UEs and performs network address translation (NATting). With IPv6, the relay UE gives either a single IPv6 address to ProSe UEs from the IPv6 prefix it received from the PGW or the relay UE requests a shorter than 64 bit prefix from the PGW via IPv6 delegation, and then assigns a 64 bit prefix to ProSe UEs.

In this approach, the relay UE controls the IP level connectivity of the ProSe UEs, from the network point of view there is only a single IP host: the Relay UE. (Application level control is possible at the network side.) It depends on the Relay UE implementation how the bearers are shared among the ProSe UEs. This type of solution is one of the candidate solutions in TR 23.703.

SUMMARY

According to certain embodiments, a method can include establishing a packet data network connection between a relay user equipment and a packet data network gateway. The method can also include establishing a relay connection between a proximity services user equipment and the packet data network gateway. The relay connection can be a connection within the packet data network connection.

In certain embodiments, a method can include connecting to a relay user equipment by a proximity services user equipment. The method can also include establishing a relay connection between the proximity services user equipment and a packet data network gateway. The relay connection can be a connection within a packet data network connection between the relay user equipment and the packet data network gateway.

An apparatus, according to certain embodiments, can include at least one processor and at least one memory including computer program code. The at least one memory and the computer program code can be configured to, with the at least one processor, cause the apparatus at least to establish a packet data network connection between a relay user equipment and a packet data network gateway. The at least one memory and the computer program code can also be configured to, with the at least one processor, cause the apparatus at least to establish a relay connection between a proximity services user equipment and the packet data network gateway. The relay connection can be a connection within the packet data network connection.

An apparatus, in certain embodiments, can include at least one processor and at least one memory including computer program code. The at least one memory and the computer program code can be configured to, with the at least one processor, cause the apparatus at least to connect to a relay user equipment by a proximity services user equipment. The at least one memory and the computer program code can also be configured to, with the at least one processor, cause the apparatus at least to establish a relay connection between the proximity services user equipment and a packet data network gateway. The relay connection can be a connection within a packet data network connection between the relay user equipment and the packet data network gateway.

According to certain embodiments, an apparatus can include means for establishing a packet data network connection between a relay user equipment and a packet data network gateway. The apparatus can also include means for establishing a relay connection between a proximity services user equipment and the packet data network gateway. The relay connection can be a connection within the packet data network connection.

In certain embodiments, an apparatus can include means for connecting to a relay user equipment by a proximity services user equipment. The apparatus can also include means for establishing a relay connection between the proximity services user equipment and a packet data network gateway. The relay connection can be a connection within a packet data network connection between the relay user equipment and the packet data network gateway.

A non-transitory computer-readable medium can, according to certain embodiments, be encoded with instructions that, when executed in hardware, perform a process. The process can include establishing a packet data network connection between a relay user equipment and a packet data network gateway. The process can also include establishing a relay connection between a proximity services user equipment and the packet data network gateway. The relay connection can be a connection within the packet data network connection.

A non-transitory computer-readable medium can, in certain embodiments, be encoded with instructions that, when executed in hardware, perform a process. The process can include connecting to a relay user equipment by a proximity services user equipment. The process can also include establishing a relay connection between the proximity services user equipment and a packet data network gateway. The relay connection can be a connection within a packet data network connection between the relay user equipment and the packet data network gateway.

According to certain embodiments, a computer program product can include instructions for performing a process. The process can include establishing a packet data network connection between a relay user equipment and a packet data network gateway. The process can also include establishing a relay connection between a proximity services user equipment and the packet data network gateway. The relay connection can be a connection within the packet data network connection.

In certain embodiments, a computer program product can include instructions for performing process. The process can include connecting to a relay user equipment by a proximity services user equipment. The process can also include establishing a relay connection between the proximity services user equipment and a packet data network gateway. The relay connection can be a connection within a packet data network connection between the relay user equipment and the packet data network gateway.

BRIEF DESCRIPTION OF THE DRAWINGS

For proper understanding of the invention, reference should be made to the accompanying drawings, wherein.

DETAILED DESCRIPTION

Figure 1:
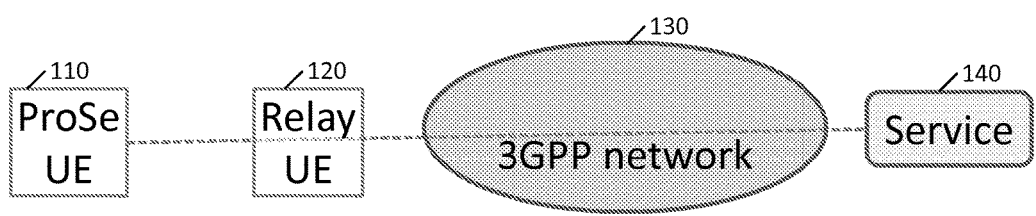
FIG. 1 illustrates a user equipment to network relay scenario.
Figure 2:
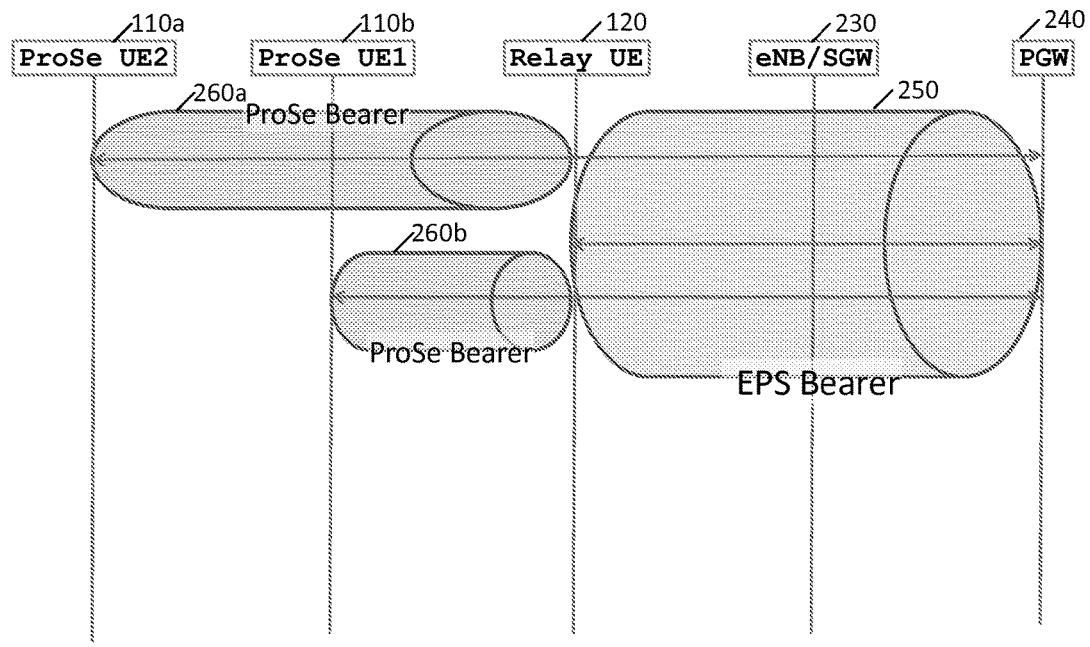
FIG. 2 illustrates bearer sharing.
Figure 3:
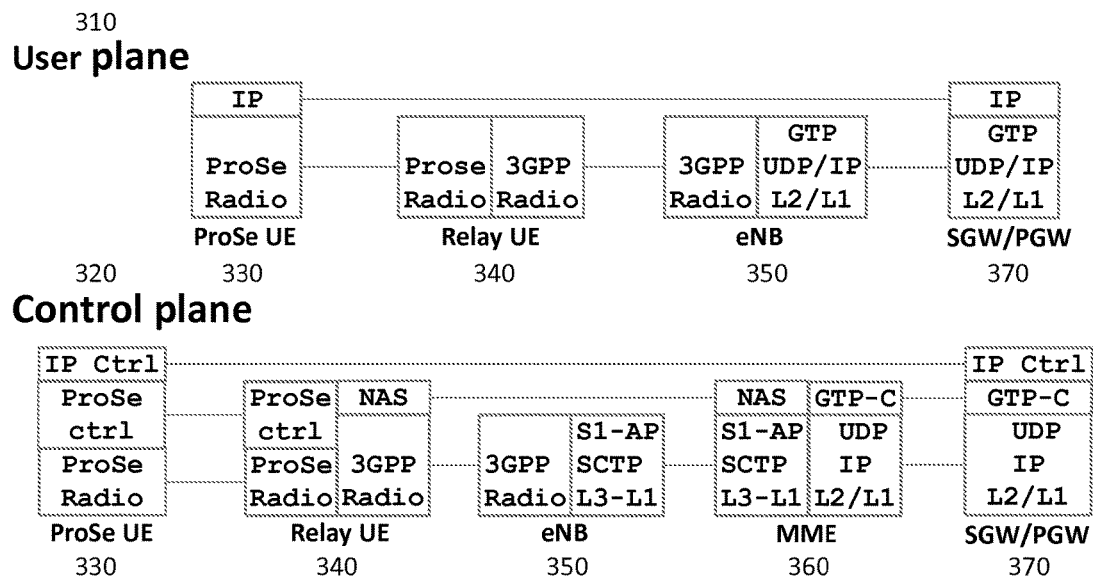
FIG. 3 illustrates a high level description of a protocol stack according to certain embodiments.

According to certain embodiments, a relay user equipment (UE) may only perform layer 2 switching, instead of acting as an internet protocol (IP) router. Also, the relay UE can act as a bridge or proxy for non-access stratum (NAS) protocol at the proximity services (ProSe) control layer. It can either relay the NAS messages as is or can forward the NAS messages with adaptations between the ProSe UE and a mobility management entity (MME). FIG. 3 illustrates a high level description of a protocol stack according to certain embodiments. For example, FIG. 3 illustrates a protocol stack of a layer 2 approach.

As shown in FIG. 3, there can be a user plane 310 and a control plane 320. In the user plane 310, there can be an IP layer from a ProSe UE 330 to a serving gateway/packet data network gateway (SGW/PGW) 370, via relay UE 340 and evolved Node B (eNB) 350. Likewise, in the control plane 320, there can be an IP control layer between the ProSe UE 330 and the SGW/PGW 370, through the relay UE 340, eNB 350, and MME 360.

The user plane 310 can also include at an underlying layer a ProSe radio link between ProSe UE 330 and relay UE 340, a 3GPP radio link between relay UE 340 and eNB 350, and various protocols including general packet radio system (GPRS) tunneling protocol (GTP), user datagram protocol (UDP), and IP at layer-2/layer-1 (L2/L1) between the eNB 350 and the SGW/PGW 370.

Similarly, the control plane 320 can also include link-specific layers. For example, between the ProSe UE 330 and the relay UE 340, there can be a ProSe control (ctrl) layer and a ProSe radio layer. ProSe Ctrl can be a subset of non-access stratum (NAS) protocol. Likewise, there can be a NAS layer between the relay UE 340 and the MME 360, through the eNB 350. The relay UE 340 and the eNB 350 can have a 3GPP radio layer. Moreover, the eNB 350 and the MME 360 can have various layers, connections, and interfaces, such as S2 application protocol (S1-AP) and stream control transmission protocol (SCTP) at layer-3 (L3) to L1. Furthermore, the MME 360 and SGW/PGW 370 can be linked with more than one layer. For example, a first layer can be a GTP-control (GTP-C) layer, and a second layer can be L2/L1 having UDP and IP.

The connection/bearer sharing may be done using what can be referred to as a relay connection. A relay connection can be a connection within a PDN connection. In the PGW and in the relay UE, the relay connections can be handled in a similar way as a normal PDN connection. At the end, however, the relay connections can be mapped to a single PDN connection and the bearers of that connection can be used. The PGW can assign the IP address/prefix to the ProSe UEs. Moreover, the relay UE can completely avoid performing any IP level control. Thus, in certain embodiments the relay UE performs no IP level control for the ProSe UE(s). The relay connections can be transparent to the nodes between the relay UE and the PGW.

Figure 4:
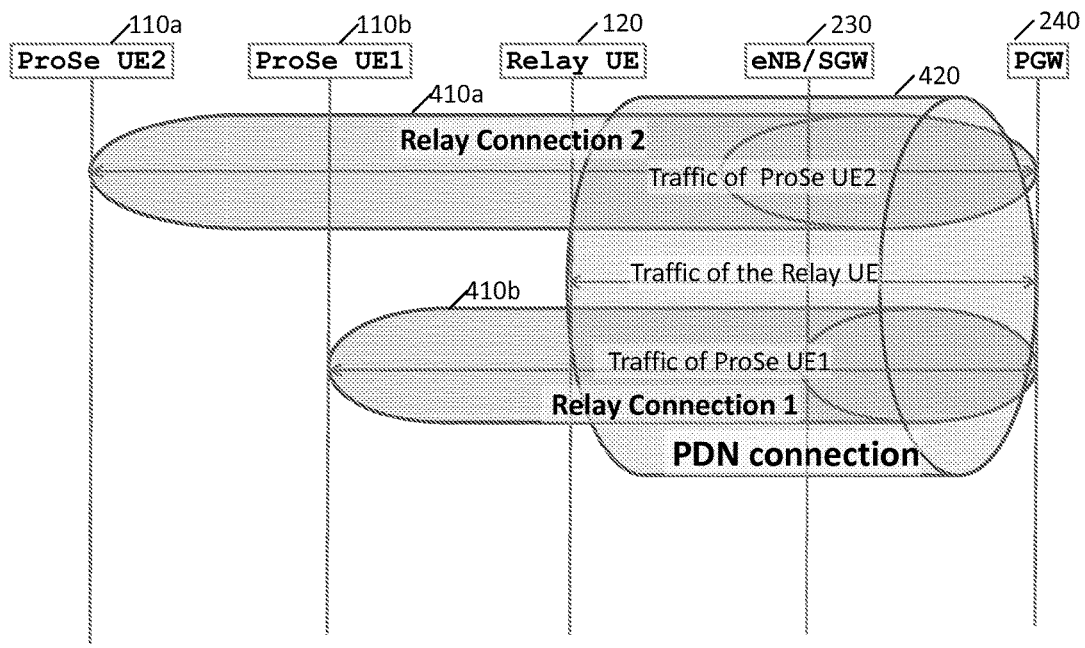
FIG. 4 illustrates relay connections in accordance with certain embodiments.

FIG. 4 illustrates relay connections in accordance with certain embodiments. As shown in FIG. 4, a first relay connection 410b between ProSe UE1 110b and the PGW 240 and a second relay connection 410a between ProSe UE2 110a and the PGW 240. A PDN connection 420 between the relay UE 120 and the PGW 240 can contain not only the traffic of ProSe UE1 110b and ProSe UE2 110a, but also the traffic of relay UE 120. These relay connections can be transparent to nodes such as eNB/SGW 230.

Figure 5:
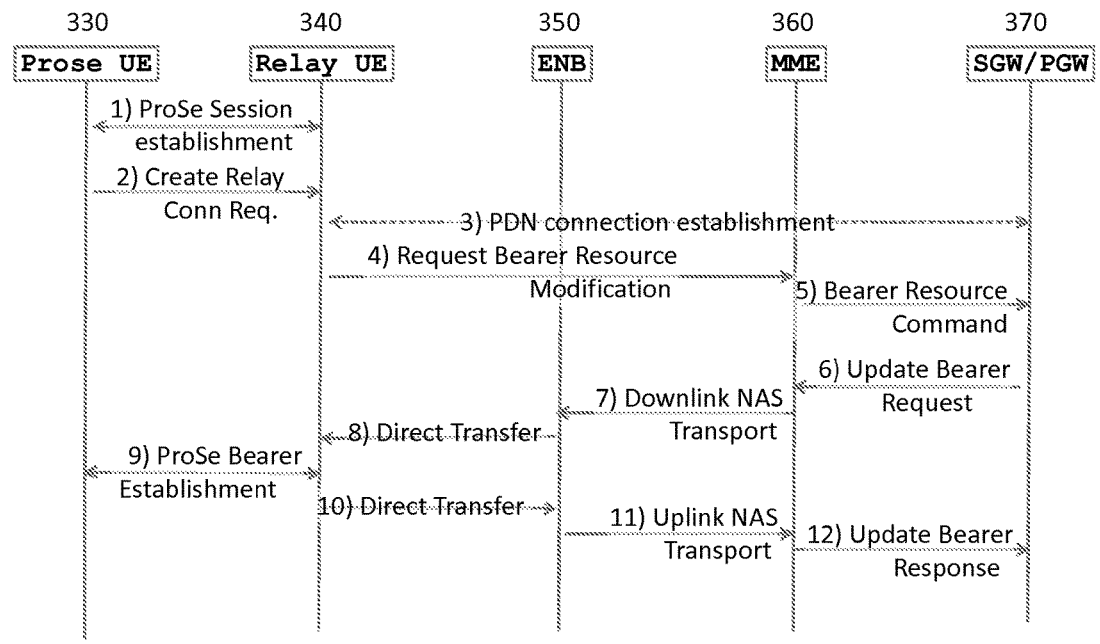
FIG. 5 illustrates a relay connection creation according to certain embodiments.

FIG. 5 illustrates a relay connection creation according to certain embodiments. In a relay connection establishment, the relay UE can use a UE requested bearer resource modification procedure between the relay UE and the PGW, with additional parameters to establish a relay connection.

As shown in FIG. 5, at 1 the ProSe UE 330 can discover the relay UE 340 and can initiate establishment of a session with the relay UE 340 for relay connectivity. This step may include mutual authentication of the ProSe UE 330 and relay UEs 340 with one another.

At 2, the Prose UE 330 can trigger the establishment of a relay PDN connection and optionally can provide an access point name (APN). If the ProSe UE 330 does not provide an APN, then such inaction can imply that a default APN can be used. Note that this step may be a part of step 1. Moreover, the other steps discussed herein can be combined or merged with one another as well, if desired.

At 3, if the relay UE 340 has no PDN connection established toward a requested APN or a default APN that can be used, then the relay UE 340 can establish a new PDN connection. A UE requested PDN connectivity procedure can be used for such a purpose. If the relay UE 340 has an appropriate PDN connection for the requested APN or a default APN when no APN was provided, then this step can be skipped.

At 4, the relay UE 340 can trigger the creation of a relay connection within the existing PDN connection by invoking a UE requested bearer resource modification procedure using, for example, a bearer resource modification request. No new type of message is needed, but new parameters can be added to indicate the addition of a relay connection, for example an identifier for relay UE 340. These new parameters can be interpreted by the PGW. This messaging of one or more new parameters can be transparent to the MME 360 and SGW, like the protocol configuration options (PCO). It is possible that the MME 360 can be aware of this new connection, for example for authorization or other purposes, but such awareness by the MME 360 is optional.

At 5, the MME 360 can forward the request to the PGW 370. If no MME authorization is needed, then this may have no impact on the MME 360.

At 6, the PGW 370 can interpret the request for the creation of a new relay connection and can allocate the IPv6 prefix and/or IPv4 address and other resources. The PGW 370 can send an update bearer request to the MME 360 via the SGW, including the IP and other parameters, such as, for example, updated traffic flow templates (TFTs).

At 7, the MME 360 can create a NAS message, such as modify evolved packet system (EPS) bearer context request, based on the information received in the previous message. The MME 360 can also send a downlink NAS transport message to the eNB 350. This behavior can performed similarly to legacy MME behavior, with the new parameters being transparent to the MME.

At 8, the eNB 350 can forward the NAS message in a direct transfer message to the relay UE 340. This can be similar to legacy eNB behavior. The new parameters can likewise be transparent to the eNB 350.

At 9, the ProSe bearer can be established between the relay UE 340 and the ProSe UE 330. During the bearer establishment, the ProSe UE 330 can also receive the IP address allocated by the PGW 370.

At 10, the relay UE 340 can send back an NAS response, such as modify EPS bearer context accept, in a direct transfer message to the eNB 350.

At 11, the eNB 350 can forward the NAS message in an uplink NAS transport message to the MME 360. This can be done similar to legacy eNB behavior with the new parameters remaining transparent to the eNB 350.

At 12, the MME can send an update bearer response message to the PGW 370 via the SGW. This behavior can performed similarly to legacy MME behavior, with the new parameters being transparent to the MME 360.

For the case when the relay UE 340 has no PDN connection to be used for the relay connection, the case when step 3 is performed above, an alternative approach is that the relay connection is established during the PDN connection establishment for the relay UE 340. This may involve the addition of the relay connection parameters to the PDN connection establishment messages. An advantage or benefit of this approach may be that fewer messages can be used, as messages related to the bearer modification procedure may be unnecessary.

Figure 6:
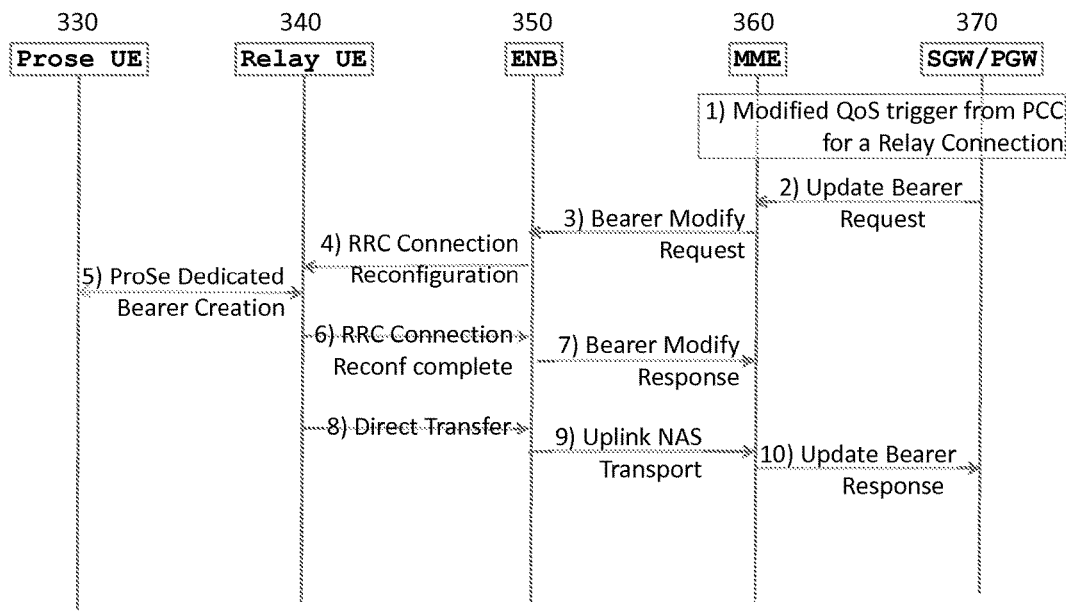
FIG. 6 illustrates establishment of a dedicated bearer for a relay connection, according to certain embodiments.

FIG. 6 illustrates establishment of a dedicated bearer for a relay connection, according to certain embodiments. Dedicated bearers to the same APN with the same quality of service (Qos) class identifier (QCI) from ProSe UEs can share a single dedicated EPS bearer. Such sharing may require the PGW to combine them. In the example below it is assumed that a dedicated bearer with the requested QCI has already been established when a policy and charging control (PCC) function sends a new policy to the PGW that triggered the establishment of a dedicated bearer. The PCC function may send this new policy, for example, due to a request from an application server. The PGW can use the bearer modification procedure with bearer QoS update to update the QoS parameters of the dedicated bearer to meet the QoS requirements of the PCC request.

As shown in FIG. 6, at 1 the PGW 370 can receive a trigger from PCC to establish a dedicated bearer for a ProSe UE 330 that is connected to the network via a relay connection. The PCC does not need to be aware of whether a relay connection or a normal PDN connection is used.

At 2, the PGW 370 can recognize that the PCC request is related to a relay connection and an existing dedicated bearer with the appropriate QCI exists to the relay UE 340 used for the relay connection. Thus, the PGW 370 can trigger a bearer modification procedure with a bearer QoS update by sending a bearer modify request to the MME 360 via the SGW. If no appropriate dedicated bearer exists, then a legacy dedicated bearer creation procedure can be used.

At 3, the MME 360 can create an NAS message based on the information received in the previous message and can send a bearer modify request to the eNB 350. This can be done using, for example, a legacy MME behavior.

At 4, the eNB 350 can process the message in, for example, a legacy way, and can start updating the radio bearer to the relay UE 340. This is a legacy eNB behavior.

At 5, the relay UE 340 can create a dedicated bearer, or something equivalent or similar, with the ProSe UE 330.

At 6-10, the dedicated bearer update procedure can continue in, for example, a legacy way between the relay UE 340 and the PGW 370.

Figure 7:
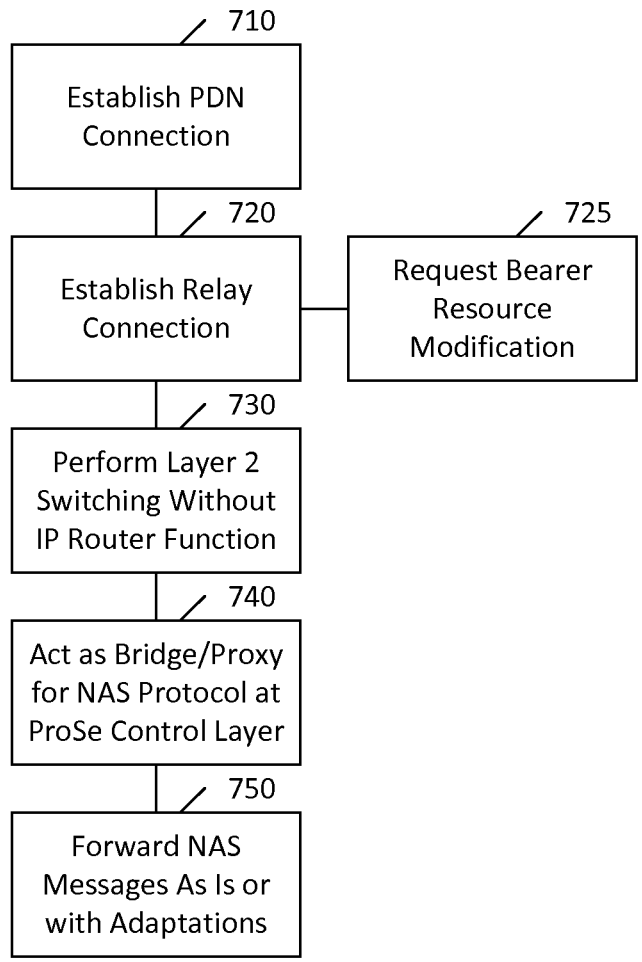
FIG. 7 illustrates a method according to certain embodiments.

FIG. 7 illustrates a method according to certain embodiments. The method may be performed by, for example, a relay user equipment. The method can include, at 710, establishing a packet data network connection between a relay user equipment and a packet data network gateway. The method can also include, at 720, establishing a relay connection between a proximity services user equipment and the packet data network gateway. Establishing the relay connection can include, at 725, requesting a bearer resource modification of the packet data network connection.

The relay connection can be a connection within the packet data network connection. The relay connection can be transparent to nodes between the relay user equipment and a packet data network gateway for the packet data network connection.

The method can also include, at 730, performing, by the relay user equipment, layer 2 switching for the proximity services user equipment without acting as an internet protocol router. The method can further include, at 740, the relay user equipment acting as a bridge or proxy for non-access stratum protocol at a proximity services control layer. The method can additionally include, at 750, forwarding, by the relay user equipment, non-access stratum messages as is or with adaptations between the proximity services user equipment and a mobility management entity. A packet data network gateway can assign an internet protocol address or prefix to the proximity service user equipment and the relay user equipment can performs no internet protocol level control for the proximity service user equipment.

Figure 8:
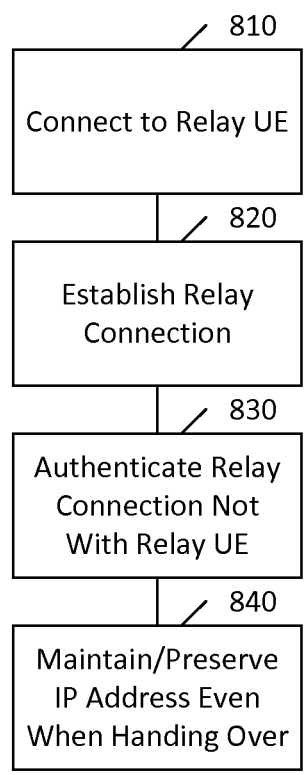
FIG. 8 illustrates another method according to certain embodiments.

FIG. 8 illustrates another method according to certain embodiments. The method of FIG. 8 can be performed by, for example, a proximity services user equipment. The method can include, at 810, connecting to a relay user equipment by a proximity services user equipment. The method can also include, at 820, establishing a relay connection between the proximity services user equipment and a packet data network gateway. The relay connection can be a connection within a packet data network connection between the relay user equipment and the packet data network gateway. Optionally, the establishing the packet data network connection is performed concurrently with the establishing the relay connection. For example, relay connection parameters can be added to PDN connection establishment messages, so as to establish both the PDN connection and the relay connection at the same time.

The method can further include, at 830, authenticating the relay connection with the packet data network gateway without involving the relay user equipment in authorization of the relay connection. In other words, packets may flow through the relay user equipment, but the authentication and authorization itself can be performed elsewhere, for example, at the SGW/PGW.

The method can also include, at 840, maintaining a same internet protocol address for the proximity services user equipment when the proximity services user equipment moves away from coverage of the relay user equipment. For example, if the proximity services user equipment is handed over to another relay user equipment, it can maintain the same internet protocol address, since it was not using the internet protocol address of the relay user equipment.

Figure 9:
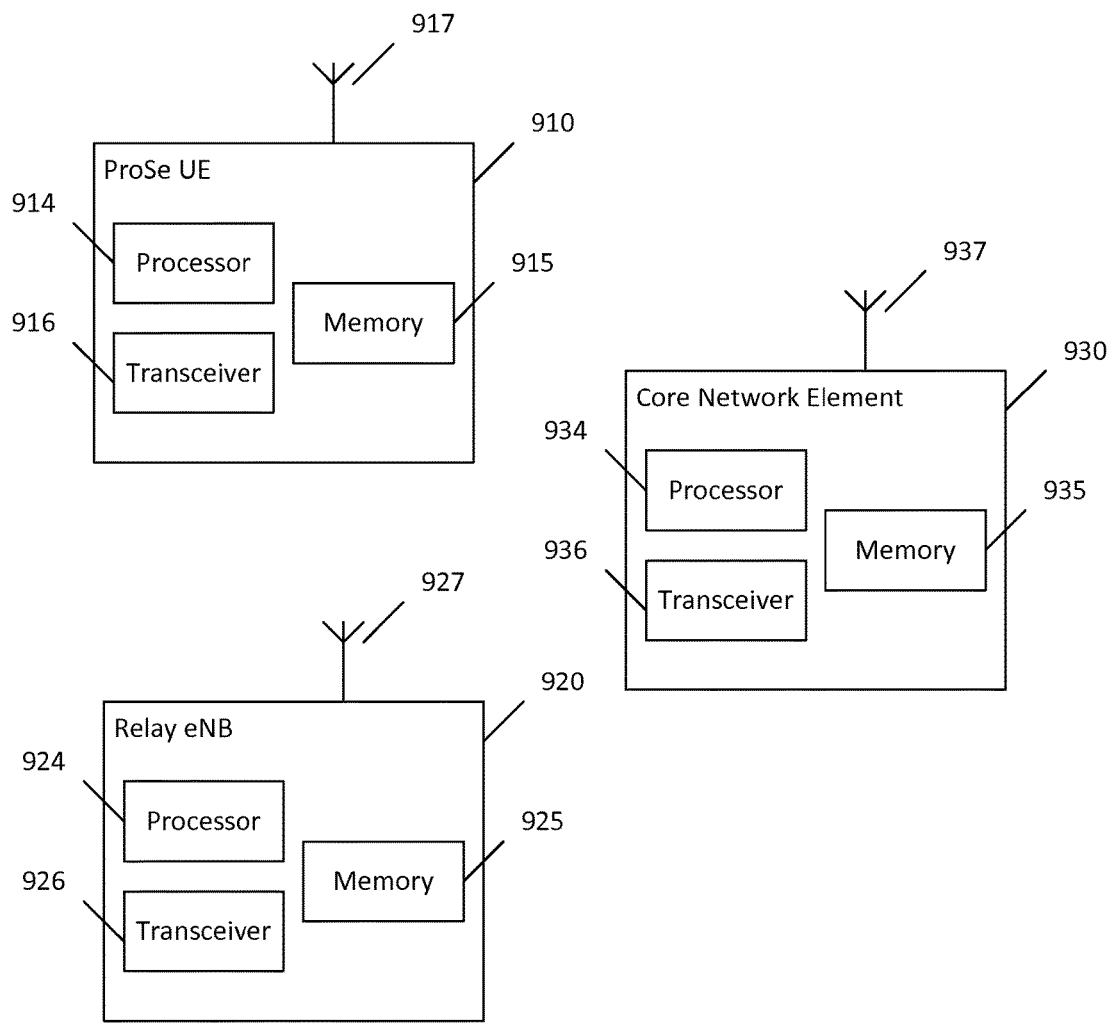
FIG. 9 illustrates a system according to certain embodiments.

FIG. 9 illustrates a system according to certain embodiments of the invention. In one embodiment, a system may include multiple devices, such as, for example, at least one ProSe UE 910, at least one relay UE 920, and at least one core network element 930, such as a PGW. Other configurations are also possible. The term "user equipment" herein should be broadly understood to refer to various user devices including, among others, mobile phones, smart phones, tablet computers, table-top computers, laptops, portable computers, wearable computers, and smart lenses. Other user devices, such as personal digital assistants are also included.

Each of these devices may include at least one processor, respectively indicated as 914, 924, and 934. At least one memory can be provided in each device, and indicated as 915, 925, and 935, respectively. The memory may include computer program instructions or computer code contained therein. The processors 914, 924, and 934 and memories 915, 925, and 935 can be configured to provide means corresponding to the various blocks of FIGS. 7 and 8.

As shown in FIG. 9, transceivers 916, 926, and 936 can be provided, and each device may also include an antenna, respectively illustrated as 917, 927, and 937. Other configurations of these devices, for example, may be provided. For example, core network element 930 may be configured for wired communication, rather than wireless communication, and in such a case antenna 937 would illustrate any form of communication hardware, without requiring a conventional antenna.

Transceivers 916, 926, and 936 can each, independently, be a transmitter, a receiver, or both a transmitter and a receiver, or a unit or device that is configured both for transmission and reception.

Processors 914, 924, and 934 can be embodied by any computational or data processing device, such as a central processing unit (CPU), application specific integrated circuit (ASIC), or comparable device. The processors can be implemented as a single controller, or a plurality of controllers or processors.

Memories 915, 925, and 935 can independently be any suitable storage device, such as a non-transitory computer-readable medium. A hard disk drive (HDD), random access memory (RAM), flash memory, or other suitable memory can be used. The memories can be combined on a single integrated circuit as the processor, or may be separate from the one or more processors. Furthermore, the computer program instructions stored in the memory and which may be processed by the processors can be any suitable form of computer program code, for example, a compiled or interpreted computer program written in any suitable programming language.

The memory and the computer program instructions can be configured, with the processor for the particular device, to cause a hardware apparatus such as ProSe UE 910, relay UE 920, and core network element 930, to perform any of the processes described above (see, for example, FIGS. 3-8). Therefore, in certain embodiments, a non-transitory computer-readable medium can be encoded with computer instructions that, when executed in hardware, perform a process such as one of the processes described herein. Alternatively, certain embodiments of the invention can be performed entirely in hardware.

Furthermore, although FIG. 9 illustrates a system including a ProSe UE, relay UE, and core network element, embodiments of the invention may be applicable to other configurations, and configurations involving additional elements, as illustrated herein, for example in FIG. 1-6.

Various embodiments may provide certain benefits or advantages. For example, certain embodiments may provide an efficient way to establish one bearer for many ProSe UE(s) via a relay UE. Moreover, the network can, in certain embodiments, perform authorization rather than requiring the relay UE to perform authorization. For example, a mobility management entity (MME) can check whether a ProSe UE has a right to use a given access point (APN).

In certain embodiments, moreover, the packet data network gateway (PGW) can be responsible for internet protocol (IP) address allocation. Therefore the handover of the relay connection to a normal PDN connection or to relay connection via another relay UE can be performed with IP address preservation. This may occur when, for example, the ProSe UE moves away from the coverage of the current relay UE.

Moreover, certain embodiments may be transparent to an evolved node B (eNB) and/or serving gateway (SGW). These and other network entities may be able to handle the connection similar to other PDN connections. The MME can be configured if special functions in the MME are desired, such as authorization, LI reporting, or the like.

Furthermore certain embodiments may avoid problems associated with NATting, even when IPv4 is used.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
    establishing a packet data network connection between a relay user equipment, the relay user equipment being configured to relay communication between a proximity services user equipment and a network, and a packet data network gateway; and
    establishing a relay connection between the proximity services user equipment, the proximity services user equipment being configured to communicate with the network via the relay user equipment, and the packet data network gateway,
    wherein the relay connection is a connection within the packet data network connection and is one of a plurality of relay connections within the same packet data connection such that the plurality of relay connections terminate at the packet data network gateway, and wherein the relay user equipment is capable of establishing a direct user equipment to user equipment connection with the proximity services user equipment.

2. The method of claim 1, further comprising:
    performing, by the relay user equipment, layer 2 switching for the proximity services user equipment without acting as an internet protocol router.

3. The method of claim 1, further comprising:
    the relay user equipment acting as a bridge or proxy for non-access stratum protocol at a proximity services control layer.

4. The method of claim 3, further comprising:
    forwarding, by the relay user equipment, non-access stratum messages as is or with adaptations between the proximity services user equipment and a mobility management entity.

5. The method of claim 1, wherein a packet data network gateway assigns an internet protocol address or prefix to the proximity service user equipment and the relay user equipment performs no internet protocol level control for the proximity service user equipment.

6. The method of claim 1, wherein the relay connection is transparent to nodes between the relay user equipment and a packet data network gateway for the packet data network connection.

7. The method of claim 1, wherein establishing the relay connection comprises requesting a bearer resource modification of the packet data network connection.

8. The method of claim 1, wherein the establishing the packet data network connection is performed concurrently with the establishing the relay connection.

9. A non-transitory computer-readable medium encoded with instructions that, when executed in hardware, perform a process, the process comprising the method according to claim 1.

10. A computer program product comprising instructions for performing a process, the process comprising the method according to claim 1.

11. An apparatus, comprising:
    at least one processor; and
    at least one memory including computer program code,
    wherein the at least one memory and the computer program code are configured to, with the at least one processor, cause the apparatus at least to
    establish a packet data network connection between a relay user equipment, the relay user equipment being configured to relay communication between a proximity services user equipment and a network, and a packet data network gateway; and
    establish a relay connection between the proximity services user equipment, the proximity services user equipment being configured to communicate with the network via the relay user equipment, and the packet data network gateway,
    wherein the relay connection is a connection within the packet data network connection and is one of a plurality of relay connections within the same packet data connection such that the plurality of relay connections terminate at the packet data network gateway, and wherein the relay user equipment is capable of establishing a direct user equipment to user equipment connection with the proximity services user equipment.

12. The apparatus of claim 11, wherein the at least one memory and the computer program code are configured to, with the at least one processor, cause the apparatus at least to perform layer 2 switching for the proximity services user equipment without acting as an internet protocol router.

13. The apparatus of claim 11, wherein the at least one memory and the computer program code are configured to, with the at least one processor, cause the apparatus at least to act as a bridge or proxy for non-access stratum protocol at a proximity services control layer.

14. The apparatus of claim 13, wherein the at least one memory and the computer program code are configured to, with the at least one processor, cause the apparatus at least to forward non-access stratum messages as is or with adaptations between the proximity services user equipment and a mobility management entity.

15. The apparatus of claim 11, wherein a packet data network gateway assigns an internet protocol address or prefix to the proximity service user equipment and wherein the at least one memory and the computer program code are configured to, with the at least one processor, cause the apparatus at least to perform no internet protocol level control for the proximity service user equipment.

16. The apparatus of claim 11, wherein the relay connection is transparent to nodes between the relay user equipment and a packet data network gateway for the packet data network connection.

17. The apparatus of claim 11, wherein the at least one memory and the computer program code are configured to, with the at least one processor, cause the apparatus at least to establish the relay connection by requesting a bearer resource modification of the packet data network connection.

18. The apparatus of claim 11, wherein the at least one memory and the computer program code are configured to, with the at least one processor, cause the apparatus at least to establish the packet data network connection concurrently with establishing the relay connection.

* * * * *